Fig. 1-A

INVENTOR.
JOSEPH F. SIBLEY
BY Edward A. Sager
ATTORNEY.

Fig. 1-D

INVENTOR.
JOSEPH F. SIBLEY
BY Edward A. Sager
ATTORNEY.

Fig.1-I

May 23, 1972   J. F. SIBLEY   3,664,784
COMPACTING PRESS
Filed Jan. 19, 1970   9 Sheets-Sheet 6
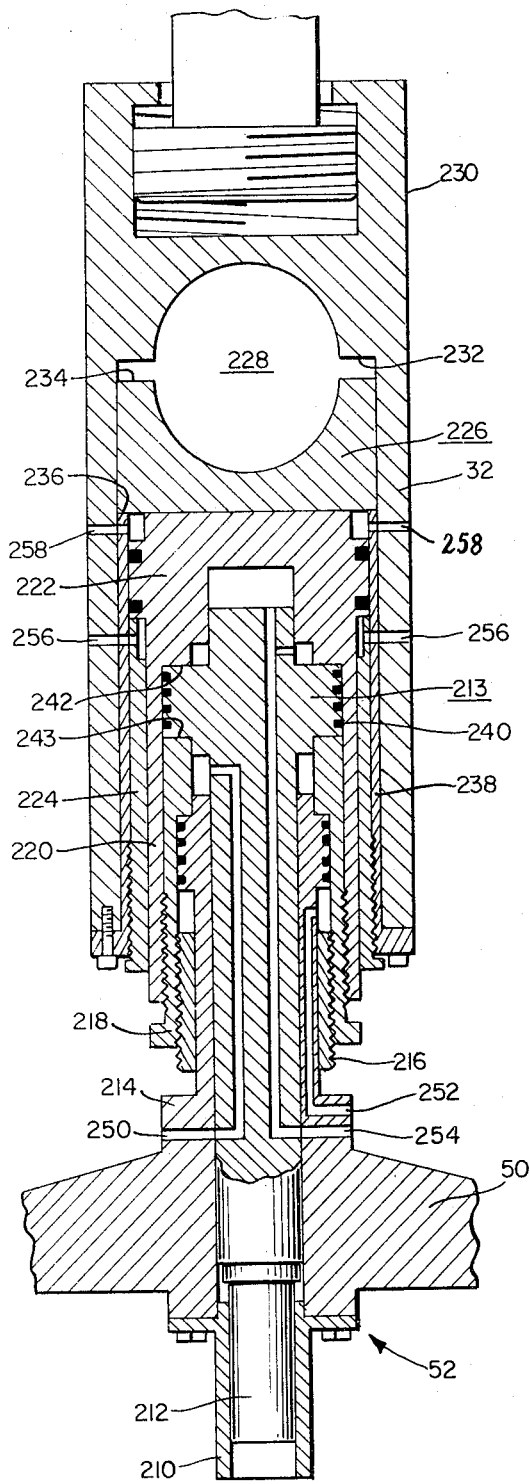
Fig. 3-A
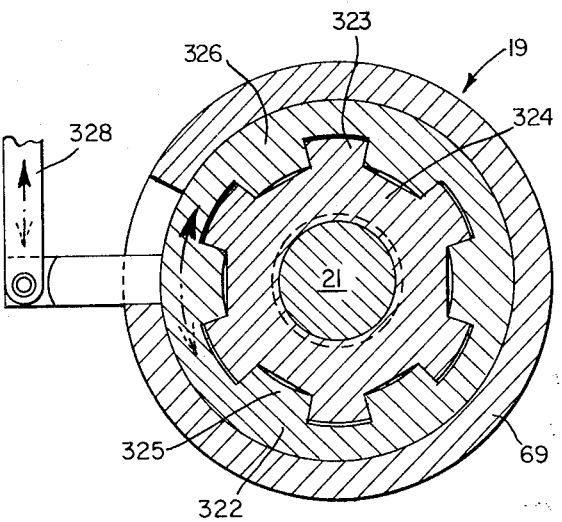
Fig. 5-I
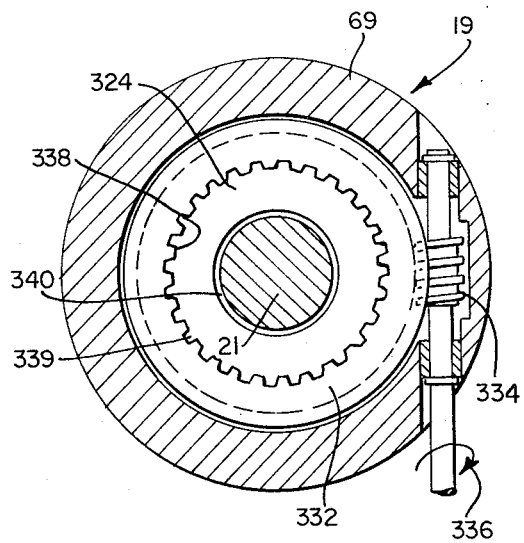
Fig. 6
INVENTOR.
JOSEPH F. SIBLEY
BY Edward A. Sage
ATTORNEY.

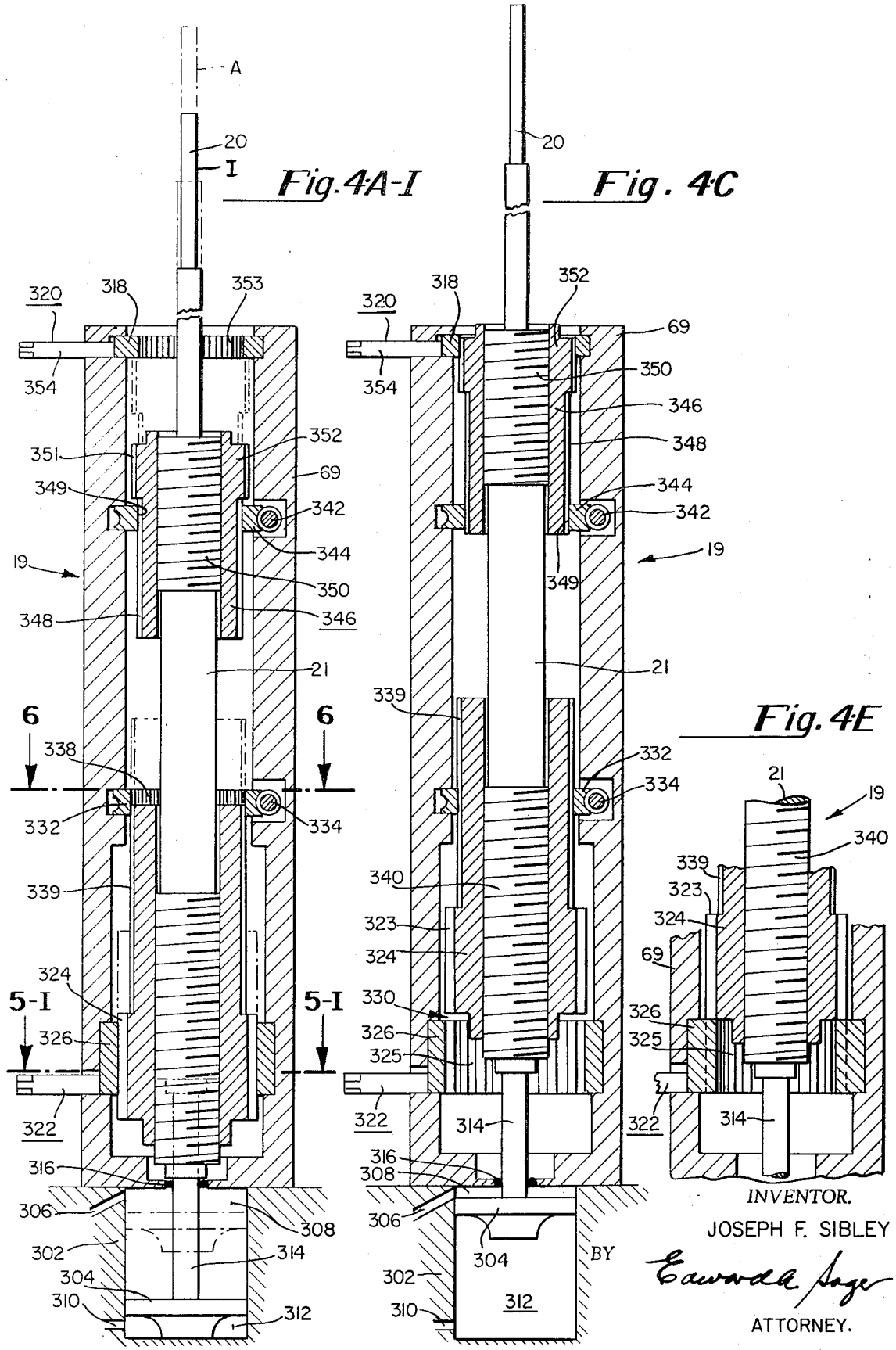

May 23, 1972  J. F. SIBLEY  3,664,784
COMPACTING PRESS
Filed Jan. 19, 1970  9 Sheets-Sheet 8
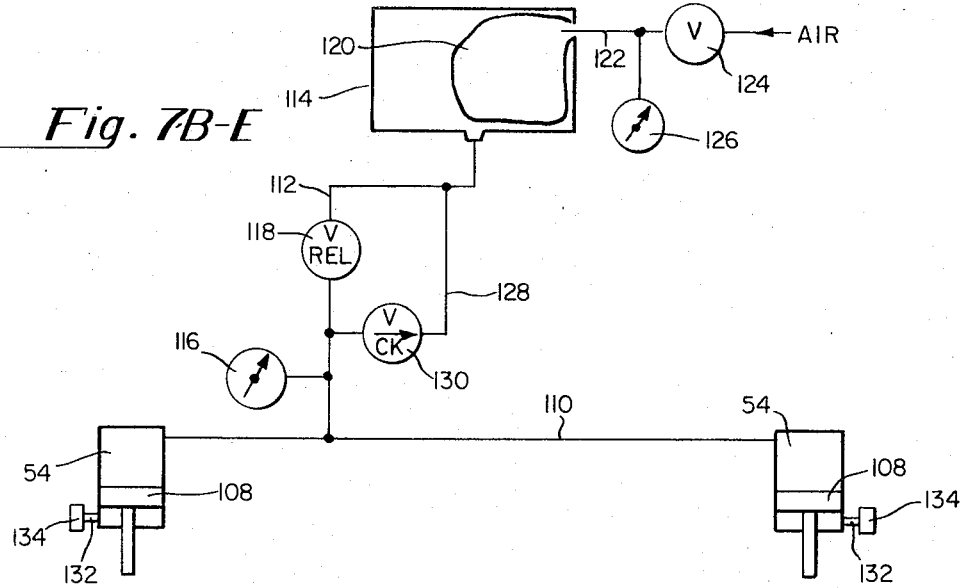
*Fig. 7B-E*
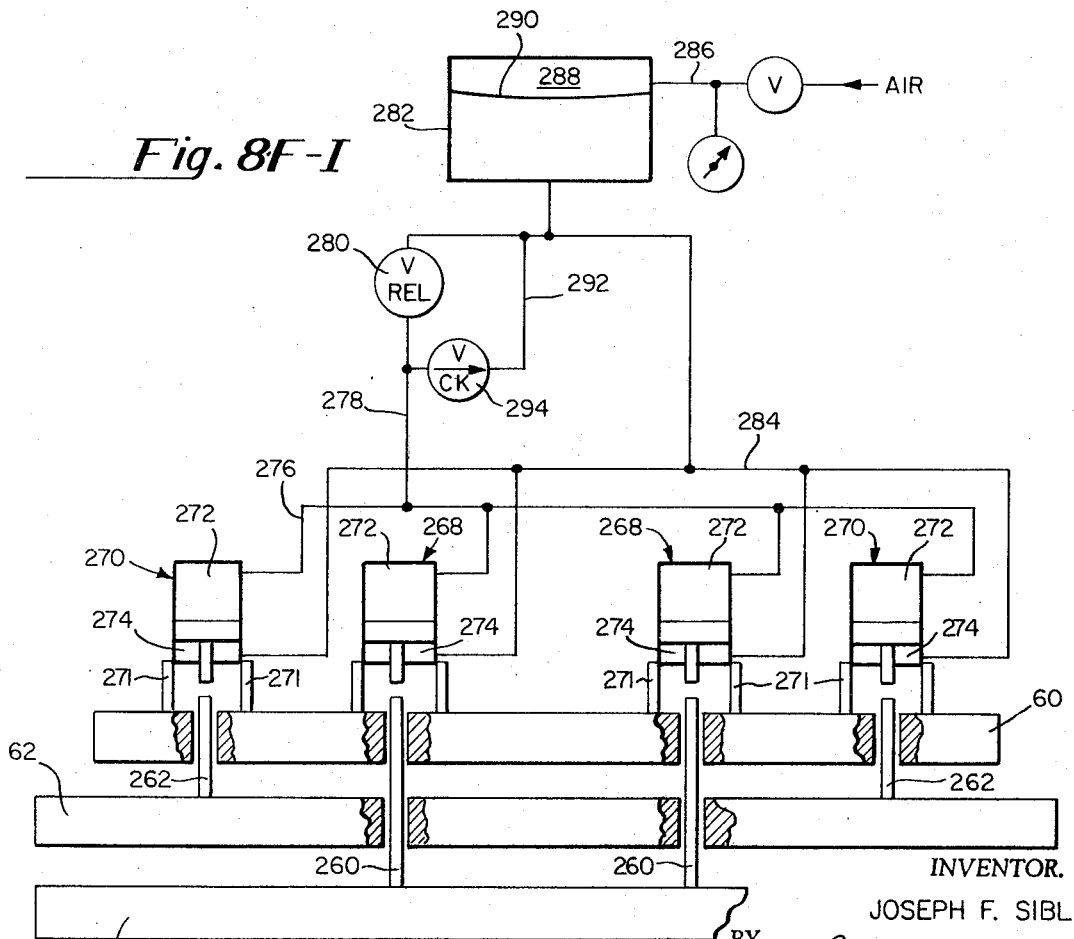
*Fig. 8F-I*
INVENTOR.
JOSEPH F. SIBLEY
BY Edward A. Sager
ATTORNEY.

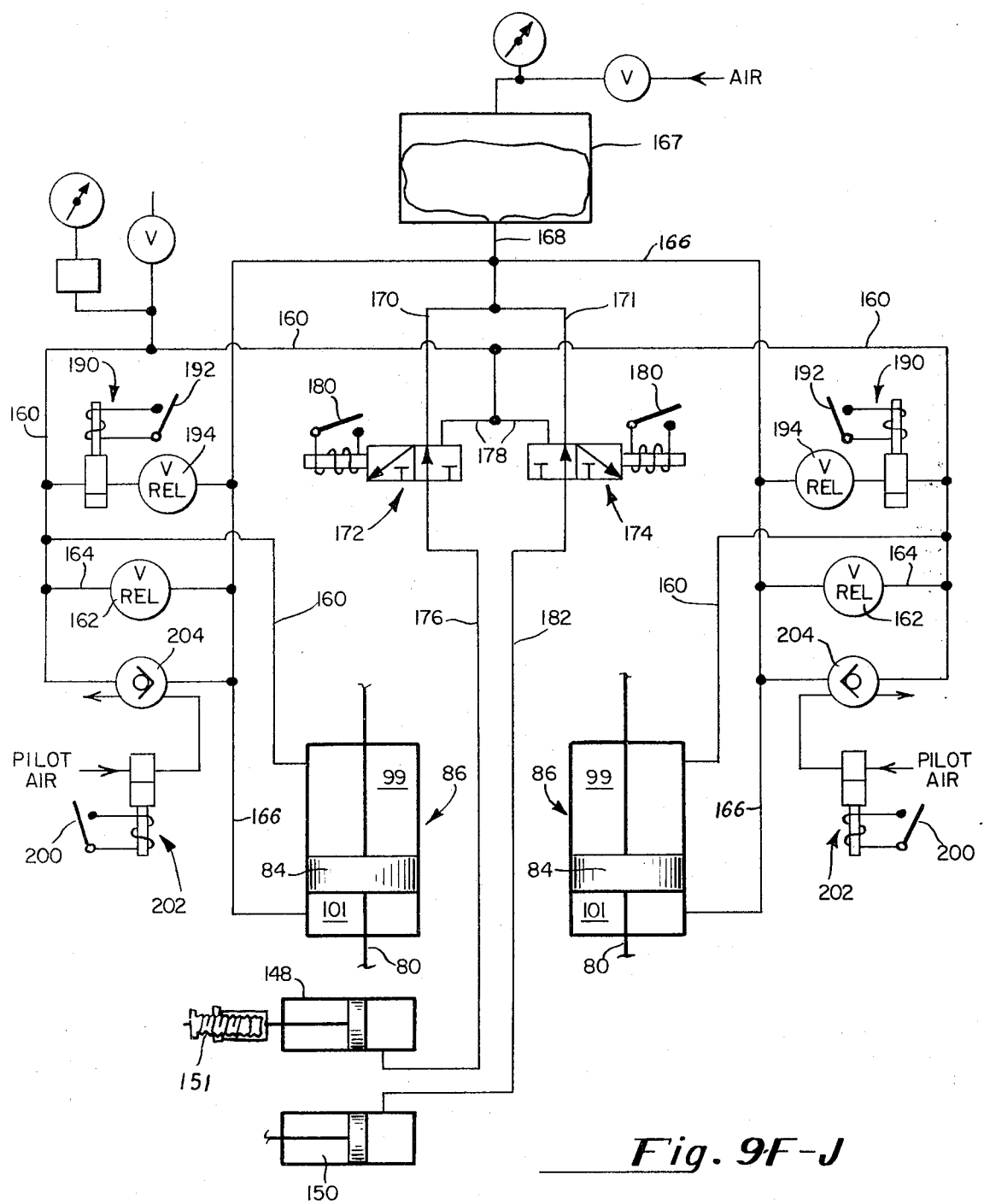
Fig. 9F-J
INVENTOR.
JOSEPH F. SIBLEY

United States Patent Office 3,664,784
Patented May 23, 1972

3,664,784
COMPACTING PRESS
Joseph F. Sibley, Philadelphia, Pa., assignor to
Pennwalt Corporation, Philadelphia, Pa.
Filed Jan. 19, 1970, Ser. No. 3,884
Int. Cl. B30b *11/02*
U.S. Cl. 425—78                                                10 Claims

ABSTRACT OF THE DISCLOSURE

A compacting press of the downacting type with a breech lock type of compression stop in the core rod, and wherein a toggle is employed to release die platens for downward motion after compression of the formed part. Provision is made to strip the dies from the formed part during ejection by applying a positive, downwardly acting force against the die table and also to prevent restriking of the formed part.

---

Figure 1:
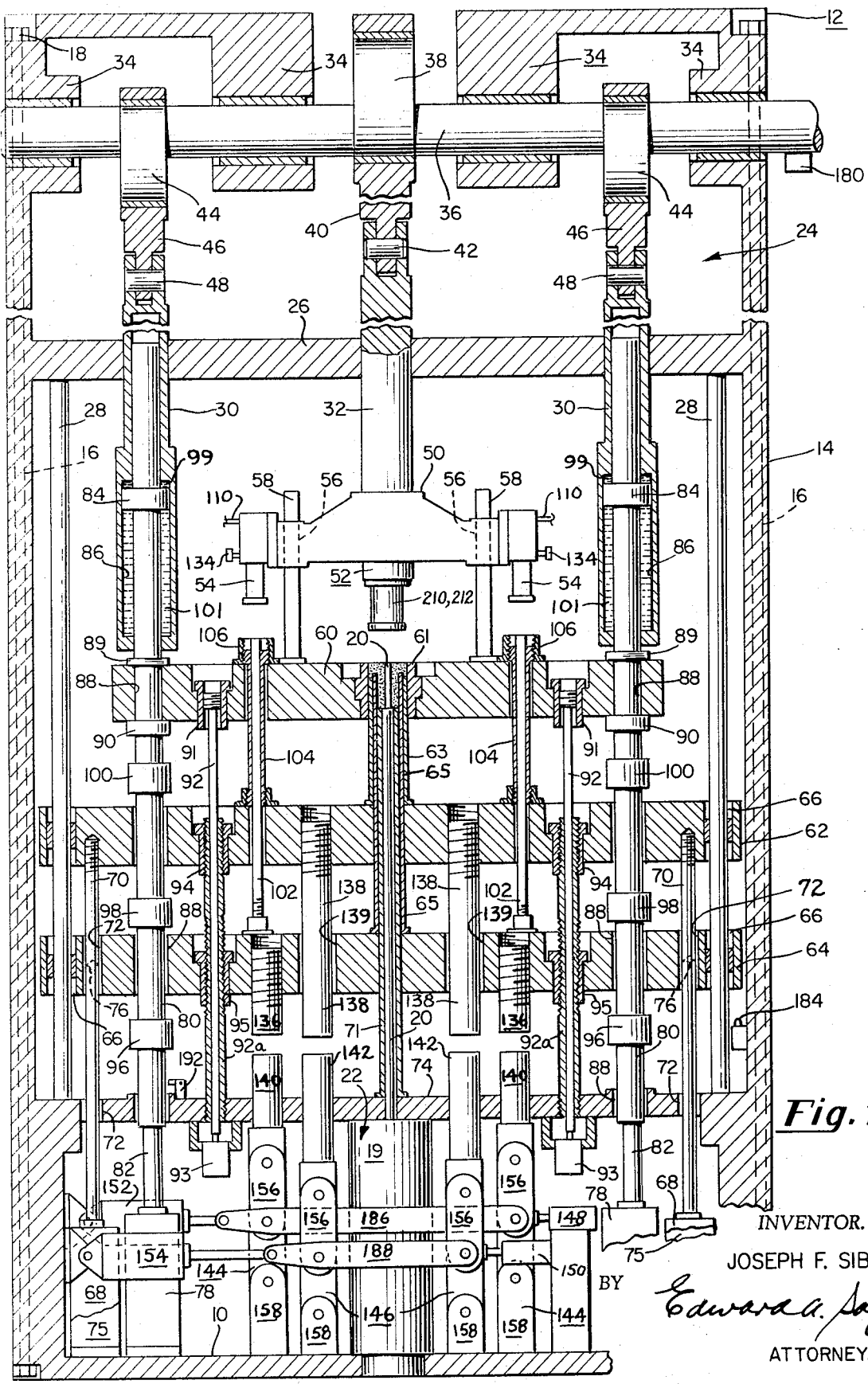

This invention relates to compacting presses, especially those of the type employed for compacting powdered substances such as metals, ceramics and the like.

Presses of the type set forth may be employed for forming multi-level parts of complex shape on a mass production basis, to satisfy the needs of the automotive, appliance and ceramic industries, and also others. Such apparatus may utilize compressive forces up to 300 tons and beyond for forming articles which may be, for example, 2 inches thick after compressing a 6 inch deep charge of loose or uncompacted powdered metal.

Prior art compacting presses have experienced some difficulty with a so-called restrike problem resulting from rebounding of the forming parts in the brief period between completion of compression and the begining of ejection. Restrike sometimes involves the making of a misaligned second impression on the surface of the formed part, or loss of definition, or even fracture. This condition may be occasioned when the ill-timed operation of the mechanism for counteracting compressive loads raises the die (and also the formed part therewith) from the anvil into a collision path with downwardly acting camming members, causing the formed part to reengage the fixed punch. In other words, the restrike problem with some prior presses also occurs during ejection as a result of premature stripping of one or more descending platens from the formed part, causing bouncing motion of the formed part against the fixed punch.

Another difficulty with prior compacting presses is that their capacity for transmitting compressive force is limited by the ability of the driven and driving surfaces to undergo stress and strain without permanent deformation. This ability depends on the strength, surface hardness, and size of the contacting parts, also on the geometry, parallelism and axial alignment of the surfaces to be engaged.

These and other problems with the prior constructions of compacting presses have been overcome by the unique construction disclosed herein.

In applying the present invention to a downacting type of upright press, compressive force from overhead mechanical means is transmitted by hydraulic means in a downward direction to a precisely adjustable ram working against a fixed punch mounted on an anvil and also movable punches held by floating or yieldingly resistive elements such as die platens. The latter, in turn, are guided for movement in vertical direction by columnar members cooperating with an arresting device for limiting the downward travel of the resistive elements.

More particularly, according to the present invention, the compacting press may have one or more platens which are initially spaced apart and biased upwardly against vertically adjustable stops. By adjusting the vertical positions of the stops, relocation of the initial positions of the platens is possible within a limited vertical range. Similarly, and within striking range of the upper punch, the extent of downward travel of each platen during compression is limited by compression stops for the respective platens. After compressive forming of the part a toggle progressively withdraws resistance to further downward movement of the platens, whereby ejection of the formed parts is accomplished by the downward stripping of the platens therefrom.

Also according to the invention, restrike is prevented by means of hydraulic shock absorbers connected to the plates to cushion the shock during compacting and to prevent rebounding of the lower platens during ejection.

Various other objects, features and advantages of the invention will appear more fully from the detailed description which follows, taken in connection with the accompanying drawings forming a part of the present application and in which:

FIG. 1–A is an elevational view of a press constructed and arranged in accordance with the invention, with the parts thereof shown positioned as they appear prior to compaction, with the die cavity filled with an uncompacted charge and level with the surface of the die table;

FIG. 1–D is an elevational view similar to FIG. 1–A, but showing the parts as they appear during the compacting portion of the cycle;

FIG. 1–I is an elevational view similar to FIG. 1–A, with the parts thereof occupying a position corresponding to the ejection portion of the cycle;

Note: The designation "–A, –D, and –I" after a figure number is made so that positions of parts can be compared with the sequence in correspondingly designated views, FIGS. 2–A to 2–J, inclusive.

Figure 2:
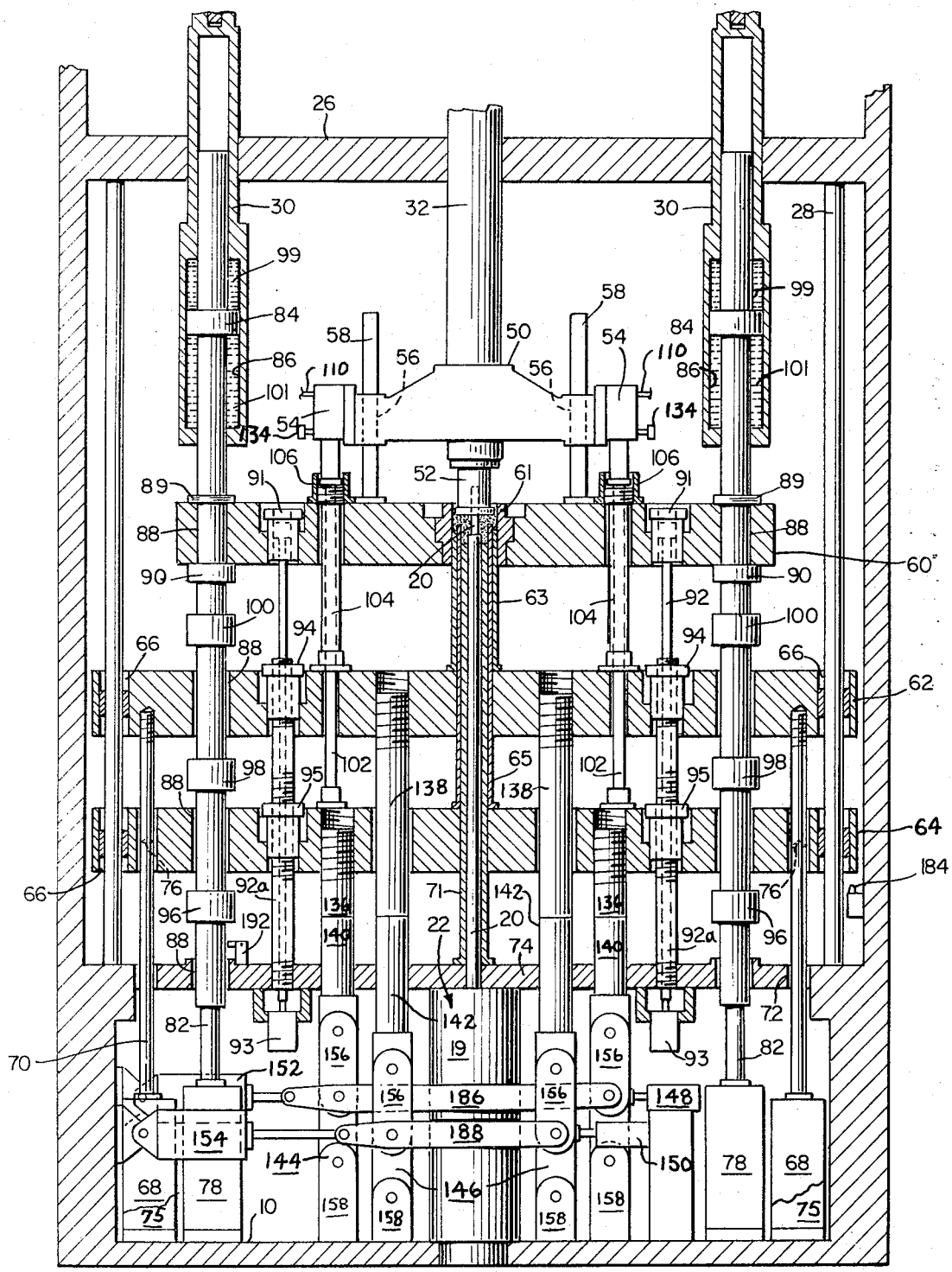
Figure 3:
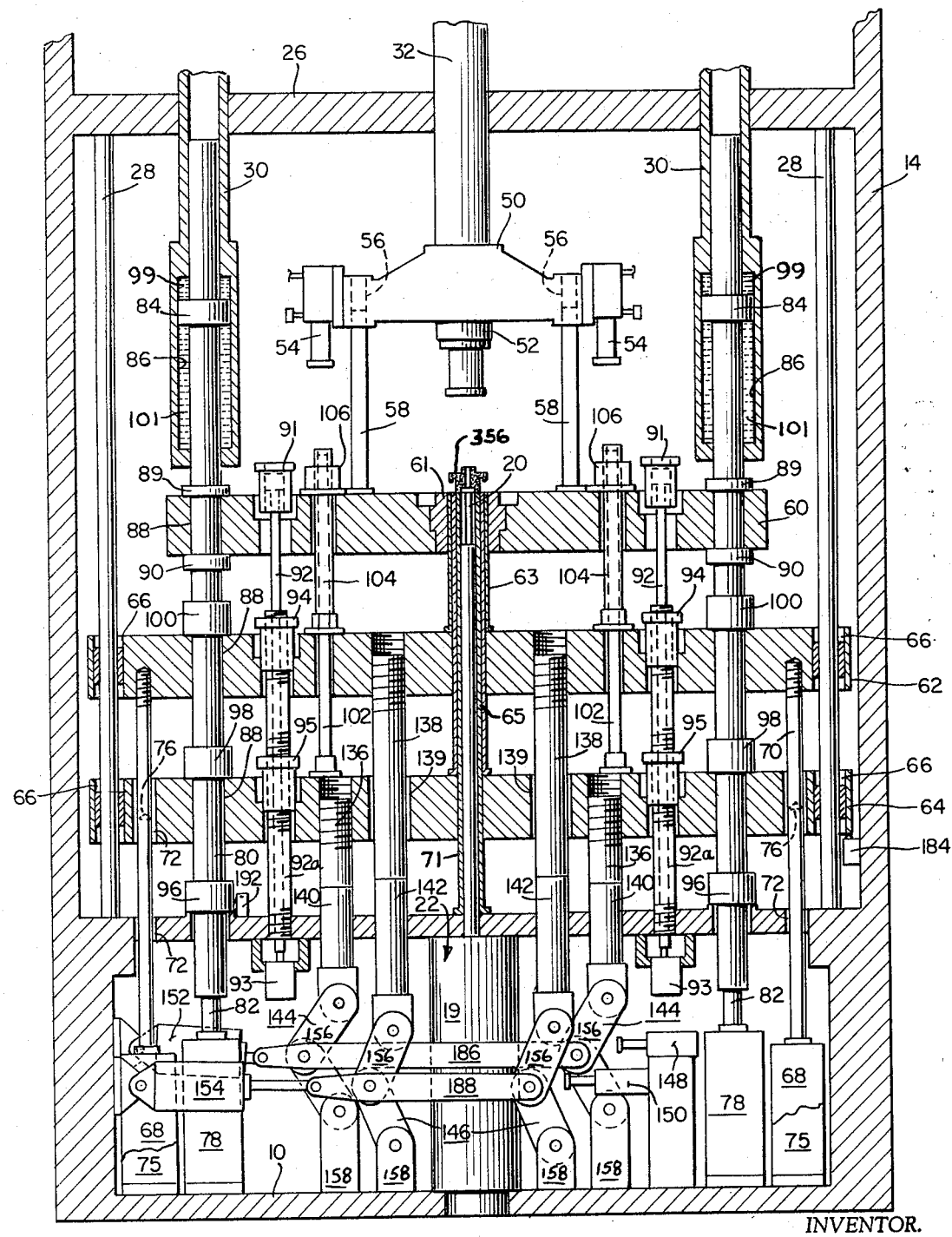
Figure 4:
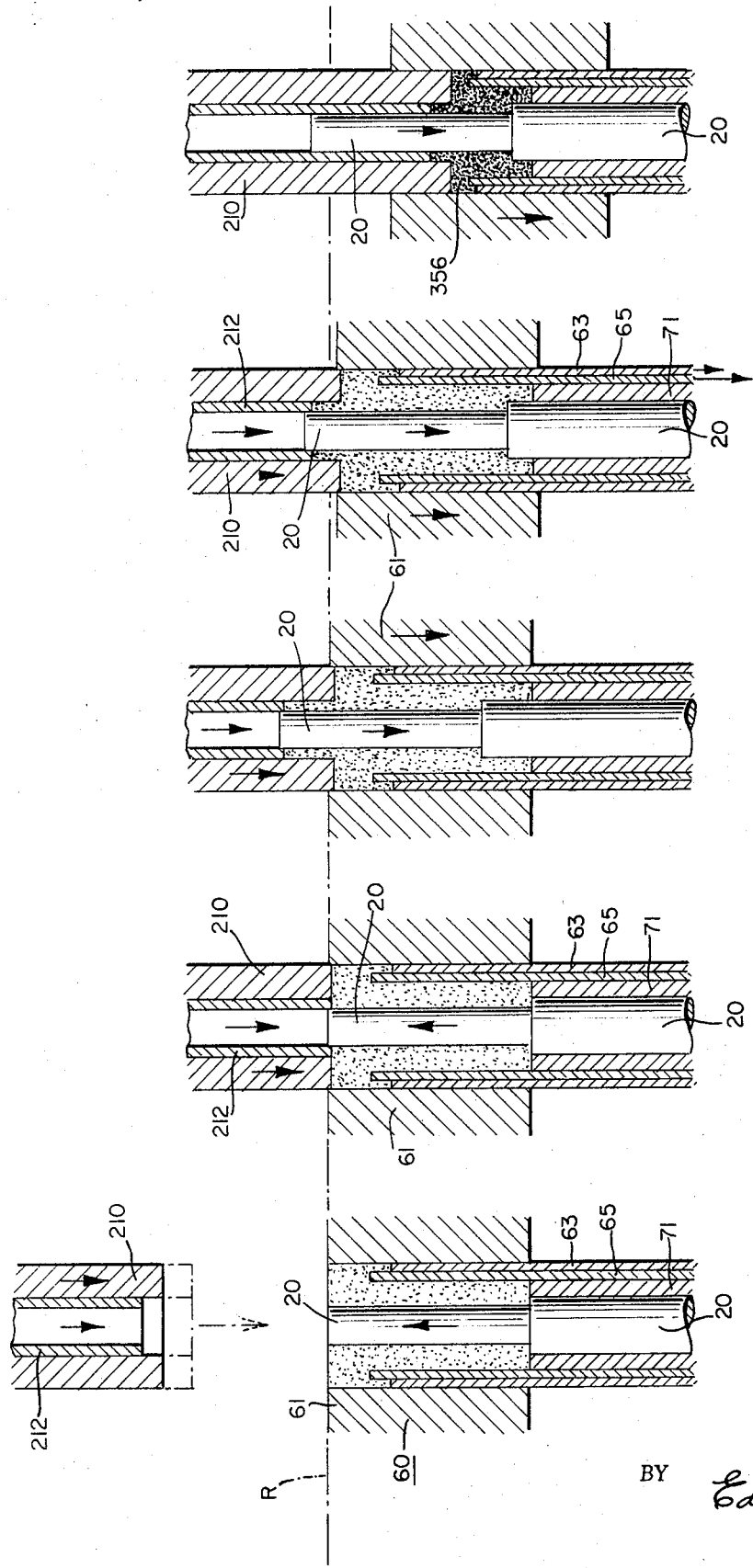
Figure 5:
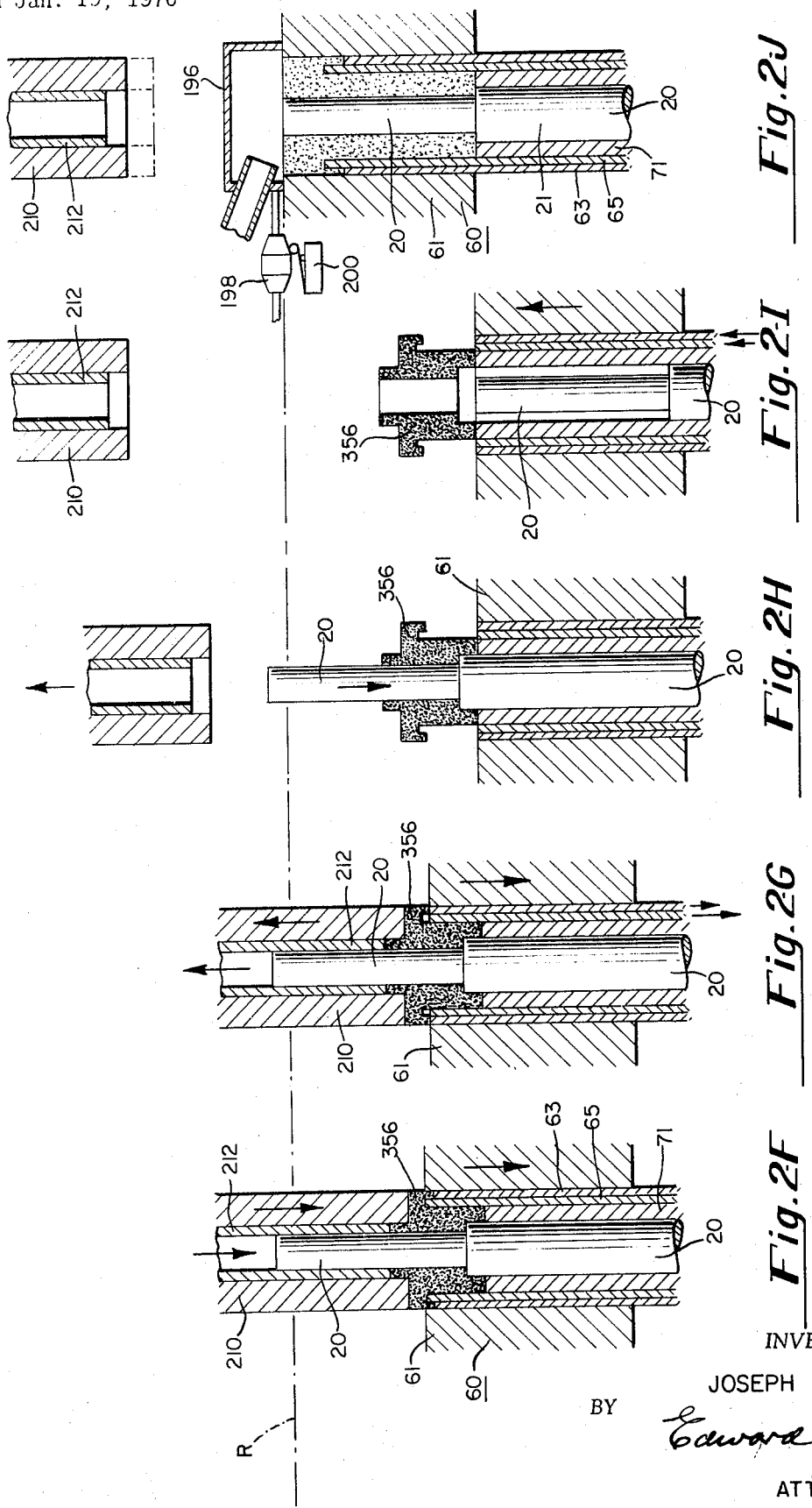

FIG. 2–A is a vertical sectional view of the upper and lower punch assemblies in an operating relationship corresponding to FIG. 1–A;

FIG. 2–B is a view similar to FIG. 2–A, but with the upper punch entering the mouth of the die cavity to close the same;

FIG. 2–C is a view similar to FIG. 2–B; but with the core rod in an elevated position within the die cavity to displace a portion of the charge into the annular region above the die table formed by the telescopic portions of the upper die punch assembly;

FIG. 2–D is a view similar to FIG. 2–C, but with the inner portion of the upper punch assembly advancing toward the die cavity, and with the core rod assuming a somewhat lower position against its compression stop to initiate compression of the charge within the die cavity;

FIG. 2–E is a view similar to FIG. 2–D, but with the upper punch assembly assuming its lowermost position in the cycle relative to the fixed lower punch, and with the die table displaced downwardly as the result of frictional engagement with the upper punch assembly as well as lateral forces applied to the bore of the die, and with the charge being fully compacted into its final form;

FIG. 2–F illustrates the positions of the upper and lower punch assemblies during the first stage of the ejection operation, wherein the die table has been displaced downwardly; and with core rod remaining against its compression stop and the upper punch assembly in previous position. In this figure the upper punch assembly does not have a compressive force from the mechanical drive unit applied thereto; but it is held in this position by an air biased ram within the slide, while continued mechanical motion of the main ram is retracted to an elevated position for the next cycle;

FIG. 2–G is a view similar to FIG. 2–F but showing the last stages of ejection, wherein all platens are engaged for downward movement in which the lower punch assembly is stripped from the formed part, with the upper punch assembly poised to move upwardly;

FIG. 2-H is a view similar to FIG. 2-G, wherein the upper punch assembly is in elevated position, with the lower platens in their lowermost position so that the parts of the lower punch assembly are moved to their lowermost position, while the core rod remains in elevated position. In this view the formed part is fully stripped from the punch parts forming the exterior surfaces thereof;

FIG. 2-I is a view similar to FIG. 2-H, in which the upper punch assembly is now in its uppermost position, all parts associated with the lower punch assembly being in their lowermost position, with the core rod fully withdrawn, whereby the formed part is stripped also from the core rod and is ready to be removed from the die area;

FIG. 2-J is a view similar to FIG. 2-A, but follows upon the position of the parts shown in FIG. 2-I, illustrating the feed shoe in position occupied on the surface of the die table after having charged the die cavity and having displaced the formed part, immediately prior to repeating the cycle beginning with FIG. 2-A;

FIG. 3-A is a vertical sectional view of a fragment of the apparatus of FIG. 1-A, illustrating the internal parts of the ram in detail;

FIG. 4-A-I is an enlarged vertical cross-sectional view of a fragment of the apparatus of FIG. 1-A and FIG. 1-I showing the interior of the core rod in detail, the parts shown in broken lines being in fill position and corresponding to the position of forming parts shown in FIGS. 1-A and 2-A, while the parts as shown in solid lines correspond to the position of parts shown in FIGS. 1-I and 2-I;

FIG. 4-C is a view similar to FIG. 4-A-I, but with the core rod in elevated position as in FIG. 2-C;

FIG. 4-E is a view similar to FIG. 4-C, but corresponding to FIG. 2-E, with the core rod positioned for final compaction against a fixed stop to prevent downward movement thereof;

FIG. 5-I is an enlarged transverse sectional view, taken along the line 5—5 of FIG. 4-A-I, showing the spline connection in a non-interfering position;

FIG. 6 is an enlarged transverse sectional view, taken along line 6—6 of FIG. 4-A-I, illustrating the adjusting mechanism of the breech lock applicable to any position of the core rod;

FIG. 7-B-E is a schematic illustration of a hydraulic circuit as is operatively associated with the lower platens for controlling movement thereof relative to the punch motions;

FIG. 8-F-I is a schematic illustration of an additional hydraulic circuit operatively associated with the platens for preventing restrike;

FIG. 9-F-J is a schematic view of still another hydraulic circuit operatively associated with the platens for controlling movement thereof during the ejection cycle, corresponding to the positions of the forming parts shown in FIGS. 2-F through 2-J;

Referring to FIG. 1-A, the compacting press of the present invention includes a floor-anchored base 10 rigidly supporting an overhead crown 12 on four upright corner columns 14. Each corner column 14 at least partly encloses a pre-tensioned tie rod 16 secured by a nut 18.

Optionally, cartridge-type heating elements may be disposed inside the tie rods 16 for uniformly pre-tensioning them, however they are not shown since they are well known in the art and do not form a part of the present invention.

The base 10 is preferably comprised of steel plate members which are welded together and then stress-relieved to form a rigid, box-like housing enclosing a core rod assembly 19 including a core rod 20 and a core rod support 21, and also a compression stop assembly 22. The assemblies 19 and 22 will be described more fully hereinafter.

The crown 12 consists of an enclosing frame supporting a drive mechanism 24, with easy accessibility for maintenance purposes. A lower horizontal plate 26 of the crown 12 fixedly secures the upper ends of two upright rods 28 serving as platen guides. The plate 26 is apertured and suitably fitted centrally and near its ends to guide not only a pair of ejection slides 30 but also an upper punch slide 32 disposed between the ejection slides 30.

The crown 12 is further provided with a horizontal series of depending main bearings 34 rotatably supporting a crank shaft 36. The latter is preferably a hardened steel forging integrally formed with three eccentrics, the central one being the main or compression eccentric 38 which is connected through a revolving pitman 40 to the upper punch slide 32. The pitman 40 and slide 32 are connected by a wrist pin 42. Outboard of the main or compression eccentric 38, on opposite sides thereof, are ejection eccentrics 44. Both ejection eccentrics 44 are in exact phase with one another for all portions of their respective camming surfaces. For example, the angular displacement of maximum throw of one of the eccentrics 44 is in angular alignment with its mate. However, both ejection eccentrics 44 are approximately 180° out of phase with the compression eccentric 38. For example, the angular displacement at maximum throw of the compression eccentric 38 is approximately 180° out of phase with the angular position at maximum throw of the ejection eccentrics 44. The camming surfaces of the eccentrics 38 and 44 are cylindrical for manufacturing convenience. For example, the ejection eccentrics 44 may be ground at the same time on a cylindrical grinding machine, thus ensuring perfect in-phase angular relationship and a perfect profile of the cylindrical camming surfaces. Similarly, the compression eccentric 38 may be made on a cylindrical grinder within fine profile tolerances.

A cylindrical camming surface has a further advantage when compared with those of the non-cylindrical variety adapted to cooperate with cam followers; and that is that the former ensures line contact with force transmitting parts and better distribution of loading forces on the faces of engaging surfaces.

As with the main or compression eccentric 38, the outboard ejection eccentrics 44 are connected through revolving pitmans 46 to the respective ejection slide guides 30, with coupling being accomplished by wrist pins 48.

At the lower end of the upper punch slide 32 there is rigidly connected a cross head 50 which, in turn, carries a downwardly extending upper punch assembly 52 from the center thereof. At the lateral extremities of the cross head 50 are platen depressor cylinders 54. Inwardly of the platen depressor cylinders are a pair of slide bearings 56 adapted to receive guideposts 58 that are vertically oriented to guide the upper punch assembly 52 for movement in vertical direction. Downward vertical movement is actuated by the upper punch slide 32, as will be described more fully. It is to be noted that the upper ends of the vertical guide posts 58 are free to slide within their respective bearings 56, while the lower ends of the posts 58 are rigidly fixed to the upper portion of the upper or floating die platen 60 for movement in vertical direction therewith.

Although the invention is not limited to a specific number of platens, the invention may be considered applicable to apparatus embodying a plurality of platens. In the specific and preferred arrangement shown and described herein, three platens are employed. Of the three platens 60, 62 and 64 shown in the drawings, there is an upper die platen 60; and immediately below it is a standard or intermediate platen 62. A lower platen 64 is disposed immediately below the intermediate platen 62. All of the platens 60, 62 and 64 are generally flat, horizontally disposed members made of mild steel or alloy steel material rigidly suited for the purpose. The intermediate platen 62 and the lower platen 64 are guided for movement invertical direction while maintaining their horizontal attitudes, by the two upright rods 28 received in closely fitting sleeve bearings 66 adjacent the ends of the platen. The intermediate platen 62 is held in elevated position by a pair of air springs 68 comprising cylinders in which pistons (not shown) travel in vertical direction as a result of forces transmitted thereto by respective, vertically extending, twin piston rods 70. The twin piston rods 70 pass through clearance holes 72 in the lower platen 64 and the cover 74 of the base 10; and the upper ends of the rods 70 are threadedly received in the underside of the intermediate platen 62 and secured thereto, as by a lock nut (not shown).

The core rod assembly 19 includes an outer tubular member or casing 69 which, together with the base 10 and horizontal cover plate 74 for the base, provide an anvil for the fixed lower punch 71. The latter is preferably an upright tubular member adapted to receive the core rod 20 in slidable, telescopic relationship.

The lower punch or tool assembly include the fixed lower punch 71 and the core rod 20. The lower tool assembly further includes the following movable punch and die parts: a die 61 carried by the floating die platen 60, a movable punch 63 carried by the intermediate or standard platen 62, and another movable punch 65 carried by the lower platen 64. The core rod 20 is of solid construction, and the fixed punch 71, the movable punches 65 and 63, and the die 61 are of tubular construction, telescopically received one within the next in the order named.

The lower platen 64 is also held in elevated position by a pair of air springs 75 which are similar to the air springs 68 associated with the intermediate platen 62 and likewise have respective, vertically extending, twin piston rods 76 lying directly in back of the piston rod 70 when viewed in elevational view as in FIG. 1–A. The piston rods 76 pass through clearance holes 72 in the base cover 74 and terminate within the lower platen 64, where their upper ends are threadedly received. The piston rods 76 may be secured to the lower platen 64 by a lock nut (not shown).

Further provided are a pair of air springs 78 which may be structurally similar to the air springs 68. The air springs 78 each have a piston rod 82 from which an upward bias is exerted through an ejection rod 80 extending vertically through and beyond a double acting piston 84 within the cylinder 86 of the ejection slide 30. The vertical extent of the ejection rod 80 is from the base cover 74 to the lower portion 26 of the crown 12; and it passes through clearance holes 88 in the base cover 74, the lower platen 64, the intermediate platen 62, and the upper platen 60. It is to be noted, however, that the upper platen 60 is secured to the ejection rod 80 by upper and lower threaded collars, designated 89 and 90 respectively. This arrangement holds the floating or upper die platen 60 in elevated position.

The vertical positioning of the double acting piston 84 is effected by the upward bias of the air spring 78 transmitted thereto by the ejection rod 80, and by a fill stop 91 associated with the upper platen 60. The fill stop 91 is adjustably positioned by cooperating threads on an upright rod-like element 92 for limiting the upward movement of the upper platen 60. Since the latter is rigidly connected through the ejection rod 80 to the double acting piston 84, this in turn limits the extent of upward movement of the double acting piston 84.

The rod-like element 92 extends between the floating platen 60 and the base cover 74 where it is anchored through a cylinder 93 providing optional, adjustable lost motion of ¼", more or less, to control overfilling of the die cavity if so desired. Additional fill stops 94 and 95 are provided for the respective platens 62 and 64 by adjustably threading them on a sleeve 92a extending between the intermediate platen 62 and the base cover 74, at which point the sleeve 92a is threadedly anchored to the base cover 74. The fill stops 91, 94 and 95 are tubular nuts, the bodies of which are freely movable through vertical bores in the platens, but having flanges received in counterbores in the top portions of the platens. The resulting abutting relationship which is established between the fill stops and the platens provides means for limiting the upward movement of the platens under the upward bias of the air springs 68, 75 and 78.

The cylinder 86 within the ejection slide 30 defines a chamber in which the double acting piston 84 is movable. The cylinder 86, being connected to the slide 30, is movable therewith as driven by the ejection eccentric 44. Thus, the piston 84 and the cylinder 86 are movable independently of one another.

Hydraulic fluid occupies the annular chambers, disposed on opposite sides of the piston 84 and defined by the outer surface of the ejection rod 80 and the inner surface of the cylinder 86, for transmitting ejection forces at a selected point in the cycle from the ejection eccentric 44 through the ejection rod 80 to the platens.

The parts associated with the ejection rod 80 during downward motion thereof will now be described. There is first a pair of lower stripper nuts 96 which are adjustably positionable on the threaded surfaces of the respective ejection rods 80. The overall downward strokes of the ejection rods 80 and the platen 60 moved thereby are limited by the position of the adjustable nuts 96 on their rods 80 in relation to the abutment or top surface of the base cover 74. Similarly, additional pairs of stripper nuts 98 and 100 on the rods 80 are positioned in relation to the respective platens 64 and 62 to engage them in selected sequence, the timing of which depends upon the periodic spacing along the length of the ejection rods 80 of the three pairs of stripper nuts 96, 98 and 100.

The vertical distance between the stripper nuts 96 and the upper abutment surface on the base cover 74 determines the extent of vertical movement, between ejection and fill positions, of the upper platen 60. The initial vertical spacing between the stripper nut 98 and the upper abutment surface of the lower platen 64, and similarly the space between the stripper nut 100 and the abutment surface of the intermediate platen 62, determines the sequence and initiation of platen movement for stripping the movable punches 63 and 65 from a formed part during ejection when the ejection rod 80 is moved downwardly.

In the FIG. 1–A illustration, the ejection rod 80 moves downwardly and carries with it the upper platen 60 and the rigidly attached die 61. Next in sequence, the stripper nuts 98 engage the lower platen 64 and initiate downward movement thereof and the punch 65; and then the stripper nuts 100 engage the intermediate platen 62 to initiate its downward movement and that of the punch 63. Finally, all platens continue to move downwardly until stripper nut 96 engages the base cover 74.

The ejection rod 80 is moved downwardly by a downwardly acting force transmitted from the ejection eccentric 44 to the cylinder 86 and thence via the hydraulic fluid through the piston 84 to the ejection rod 80.

The hydraulic system will be described in greater detail hereinafter, but it will suffice to say for the present that when the stripper nut 96 engages the upper surface of the base cover 74 it also trips switch 192, thereby giving a signal to relieve the hydraulic pressure in the upper chamber of the cylinder 86 and spill the fluid at a reduced pressure to the lower chamber of the cylinder 86, whereby a downwardly directed holding pressure is exerted on the platens through the ejection rod 80.

The position of the stripping nut 96, 98 and 100 in relation to the platens in the lowermost position of the ejection rod 80 can be seen in FIG. 1–I.

The platen depression sequence during compacing will now be described. Platen depression is accomplished in programmed sequence in accordance with the relationship between the platen depression cylinder 54 and platen depression elements 102, 104 and 106 respectively associated with the platens 64, 62 and 60. The platen depression member associated with the lower platen 64 is a platen depression rod 102. The platen depression member associated with the intermediate platen 62 is a platen depression sleeve 104. The platen depression member associated with the upper platen 60 is a short tubular platen depression housing 106. The rod 102, the sleeve 104, and the housing 106 are freely received one within the next respectively. As the upper punch assembly 52 moves downwardly, the platen depressor cylinders 54 move therewith into sequential engagement with the upper ends of the elements 102, 104 and 106, transmitting through them downward motion to the respective platens 64, 62 and 60. Lower movable punches are moved with their associated platens.

Downward motion of the individual platens 62 and 64 is arrested by the compression stop assembly 22, to be described hereafter. With the arrest of downward platen motion, a piston 108 of each platen depressor cylinder 54 encounters resistance, whereby hydraulic pressure builds up in the cylinders 54 and pressurizes hydraulic fluid in the circuit shown in FIG. 7 B–E. This hydraulic circuit includes a line 110 connecting the cylinders 54, above piston 108, through a T connection and a line 112 to an accumulator 114. Line 112 is provided with a pressure gauge 116 and also a pressure relief valve 118, the latter controlling fluid flow to the accumulator 114 by opening at or above a predetermined pressure but otherwise remaining closed. An expansion diaphragm 120 within the accumulator 114 is kept under pressure by air from a pressurized source, connected thereto by a line 122 in which a control valve 124 and a pressure gauge 126 is provided. When the depressor cylinders 54 no longer encounter resistance, as when the upper punch slide is elevated to initial position, the line 110 is depressurized by expansion in the cylinders 54 which are then refilled by a flow of hydraulic fluid from the accumulator 114 via a line 128 bypassing relief valve 118 and line 110. A check valve 130 in bypass line 128 remains closed when the pressure in line 110 exceeds the pressure in the accumulator and flows thereto, but check valve 130 opens when an opposite pressure differential exists and fluid flows back to the cylinder 54 from the accumulator 114. During reverse flow, as described, the creation of a vacuum within the accumulator 114 is avoided by expansion of the diaphragm 120 to occupy the volume of fluid that is withdrawn. Further provided the cylinders 54 is a breather line 132 equipped with a filter 134 to maintain the underside of the piston 108 at atmospheric pressure.

The compression stop assembly 22 includes a pair of laterally spaced bumpers 136, each in the form of a threaded rod, extending downwardly from a threaded connection at the underside of the lower platen 64, also a pair of similar but longer bumpers 138 extending from the underside of the intermediate platen 62 through clearance holes 139 in the lower platen 64. The bumpers 136 and 138 terminate above the base cover 74. Extending upwardly from the base cover 74 are pairs of rod-like stops 140 and 142 for the respective bumpers 136 and 138. Associated bumpers and stops are vertically aligned and movable into and out of abutting engagement. Each stop 140 is mounted on a toggle joint 144 serving as stop withdrawal means; and there is a similar toggle joint 146 for each stop 142. The pairs of toggle joints 144 and 146 are operable independently of one another, as when withdrawn by respective hydraulic cylinders 148 and 150, as will be explained. Air cylinders 152 and 154 are arranged in opposition to the respective hydraulic cylinders 148 and 150 for holding the stops 140 and 142 in normal arresting position; and each air cylinder yields to a greater opposing force from its associated hydraulic cylinder.

Each of the toggle joints 144 and 146 comprises two bars 156 and 158 jointed together end to end to form a knee which provides support for its respective stop 140 and 142 when the two bars are in upright alignment. The hydraulic cylinders 148 and 150 independently apply a lateral force to the knee of the associated toggle joint tending to move the bars 156 and 158 out of upright alignment when formation of a part is completed. This action overcomes the opposing force of the air cylinder tending to hold the bars 156 and 158 in alignment, and thereby withdraws the stop from arresting position and reduces the mechanical resistance of the knee to downward forces. Hydraulic actuation of the cylinders 148 and 150 may be sequential in predetermined order. The aforesaid parts are movable from the positions of FIG. 1–D to the positions of FIGS. 1–I during ejection of a formed part. After ejection, the hydraulic actuation by the hydraulic cylinders 148 and 150 is terminated and the air cylinders return the toggle joint and stops to original position of FIG. 1–A.

The hydraulic system and the controls therefor associated with the ejection cylinders 86 will now be described with particular reference to FIG. 9F–J. As there shown, each double-acting piston 84 is disposed within a lower portion of its cylinder 86, with hydraulic fluid filling both the upper chamber 99 and the lower chamber 101 of the cylinder. As mentioned previously in connection with the function of the stripper nut 96 of FIG. 1, the ejection rods 80 move downwardly from the positions of FIG. 1–D to the positions of FIG. 1–I under a downwardly acting force transmitted from the ejection eccentric 44 to the cylinder 86. The force is then transmitted via the hydraulic fluid in chamber 99 through the piston 84 to the ejection rod 80. During stripping, therefore, hydraulic pressure builds up in chamber 99 and discharge line 160. Line 160 is a loop line connecting the respective chambers 99 of the cylinder 86. However fluid flow is prevented because all valves in lines connected to the discharge line 160 are closed during stripping, as will be explained. With this arrangement the fluid in chamber 99 acts as a force-transmitting medium between the cylinder 86 and the piston 84.

When the stripper nut 96 engages the base cover 74 the increased resistance to movement of the rod 80 and the piston 84 subjects the fluid in upper chamber 99 and discharge line 160 to further compressive force. A protective relief valve 162 in line 164 opens at a predetermined pressure in the range of say 4500 to 5000 p.s.i. Line 164 is connected through valve 162 between line 160 and another loop line or return loop line 166, thus establishing a fluid connection between the relatively low pressurized lower chambers 101 of cylinder 86 and the upper chambers 99 to guard against excessive pressures in the hydraulic ejection system.

Loop line 166 is in fluid connection with a hydraulic fluid accumulator 167 through branch line 168, as well as the parallel lines 170 and 171 leading from line 166 to the respective solenoid operated control valve 172 and 174.

Solenoid valve 172 is a two-position, three-way valve which connects the line 176 from the hydraulic toggle cylinder 148 to either line 170 or to a line 178 branching off loop line 160. As shown in FIG. 9–F–J, the de-energized solenoid valve 172 normally connects line 176 with line 170 in one position thereof; and when energized valve 172 connects line 176 with line 178. The energization of the solenoid of valve 172 is by a gang switch 180 of FIG. 1–A which is operatively associated with the crankshaft 36 and is positionally responsive to angular rotation of the crankshaft. Alternatively switch 180 can be responsive to the vertical position of one or more platens.

Solenoid valve 174 is also a two-position, three-way valve, but it operates and is controlled independently of valve 172. Deenergized solenoid valve 174 normally connects a line 182 leading from the hydraulic toggle cylinder 150 with the line 171 branching off the loop line 166. When the solenoid of valve 174 is energized, however, line 182 is then connected to a line 178 branching off the return loop line 160. The energization of solenoid valve 174 is by a limit switch 184 arranged for actuation of a platen, e.g. lower platen 64, as in FIG. 1–A.

Thus, with the toggles in tripped or broken position the lines 166, 170 and 171 communicate with the toggle cylinders 148 and 150 through their respective associated solenoid valves 172 and 174 since the latter are deenergized. However the valves 172 and 174 may be shifted by a predetermined sequence of energization which is controlled by the switches 180 and 184. Such shifting connects line 160 through lines 178 to lines 176 and/or 182 for delivering pressurized fluid to either or both toggle cylinders 148 and 150. Assuming that gang switch 180 is first energized, the valve 172 will shift and direct the more highly pressurized fluid from loop line 160 through lines 178 and 176 to the toggle cylinder 148. Hydraulic pressure in cylinder 148 is sufficiently high that the opposing force of air cylinder 152 is overcome and both toggle joints 144 are moved in unison to the position of FIG. 1–I. The toggle joints 144 move in unison because they are connected together by a connecting bar 186.

The apparatus and fluid circuity of FIG. 9–F–J may be wholly or partly duplicated if additional cylinders 148 and 150 are employed.

In the normal position of the valves 172 and 174, in which they are spring-biased to close lines 176 and 182, pressurization of loop 160 during stripping does not effect movement of the toggle joints 144 and 146; and with normal pressures there is no passage of fluid from line 160 to lines 164 and 166 through the relief valves 162.

It should be recalled that the air cylinders 152 and 154 exert an opposing force which must be overcome by the respective hydraulic cylinders 148 and 150 in order to withdraw the stops 140 and 142 by toggle action. It is to be noted, therefore, that the pressure within each cylinder 99, during stripping and before the stripper nut 96 engages the base cover 74, is less than the pressure at which the relief valve 162 is opened, and that hydraulic pressure in the toggle cylinders 148 and 150 less than opening pressure for the relief valve 162 is sufficient to overcome the opposing force of the air cylinders 152 and 154. This action "breaks" the toggle and mechanical action then takes over to continue the knee action required in stripping for lowering the stop.

Similarly, when limit switch 184 is next closed, for example, and solenoid valve 174 is energized the other toggle cylinder 150 is sufficiently pressurized through line 182 to overcome the opposing force of air cylinder 154. The toggle joints 146 are connected by a bar 188 for unitary movement, and therefore they then move in unison to break the toggle joint and withdraw the stops 142. The toggle cylinders 150 are actually pressurized simultaneously by parallel lines 182 even though but one line 182 and one cylinder 150 is shown schematically in FIG. 9–F–J.

After both solenoid valves 172 and 174 have been energized, both sets of toggles have been tripped, the stops regressed, and all platens are approaching the bottom of the ejection stroke. At this point a pair of two-position, four-way diverting valves 190 serve to hold the platens in lowermost position during ejection, sweep-off of the formed part, and movement of the feed shoe 196 into charging position. The valves 190 are solenoid operated by a switch 192, located on a cover 74, when the switch is engaged by lower stripper nut 96 on ejection rod 80. Such actuation of valves 190 opens them to the flow of high pressure fluid from line 160, through them and relatively low pressure (75–1000 p.s.i.) relief valves 194 into the return loop 166 and back into the lower chamber 101 of the ejection cylinder 86. All platens dwell at this time, the movement of the feed shoe 196 having been initiated also by switch 192. The feed shoe 196 moves into charging position while bumping the formed part from a position adjacent the mouth of the die cavity; and at the same time hydraulic fluid continues to flow from the upper chamber 99 to the lower chamber 101 of the ejection cylinder 86 via valves 190 and 194.

In charging position of the feed shoe 196 a cam 198 carried thereon engages a microswitch 200, thereby energizing a solenoid operated pneumatic valve 202 to deliver pilot air for opening check valve 204. This action quickly dumps pressurized fluid at full flow through valve 204 from chamber 99 to chamber 101. Effectively, this action removes the downward force on the ejection rods 80 and subjects them to the upward force of the air springs 78. In addition, air springs 68 and 75 exert an upward bias through their respective platens on the ejection rods so long as the platens engage their associated stripper nuts 98, 100.

The upper punch assembly 52 and the upper punch slide 32 will now be described in detail. As shown in FIG. 3A, provision is made for a plurality of punches in the upper punch assembly 52, there being an outer tubular punch 210, and also an inner punch 212 which is slidably and telescopically arranged within the outer punch 210. A piston-like upper extension 213 of the inner punch 212 extends upwardly through the crosshead 50. The outer punch 210 is rigidly secured to the crosshead 50 by any suitable securing means, such as a circular flange mount and, in turn, to an outer ram 214. The outer ram 214 is slidably received within an adjusting sleeve 216. The adjusting sleeve 216 is threadedly received on its exterior within a cylindrical liner 218, and the latter is disposed within a cylinder 220, there being cooperating threads between the parts 218 and 220. The cylinder 220 is a hollow structure depending from a piston-like, hold down ram 222. The cylinder 220 is slidably disposed within a tubular stop 224. The stop 224 is threadably connected to the inner cylindrical surface of the upper punch slide 32. More particularly since the lower end of the slide 32 is subdivided into inner and outer cylindrical parts, bolted together as shown for convenience of assembly, the stop 224 is actually connected to the inner cylindrical part 238.

Disposed immediately above the hold down ram 222 is an overload ram 226 which is adapted for vertical movement within a chamber 228. The chamber 228 is pressurized with a mixture of nitrogen and oil, the nitrogen providing an inert compressible medium and the oil providing lubrication. Depending upon the portion of nitrogen and oil contained within the chamber 228, compressibility of the fluid medium contained within the chamber 228 can be adjusted for a particular situation.

The construction is such that the overload ram 226 carries the total compressive force between the punches 210 and 212 and the upper portion 230 of the slide 32.

The surfaces designated in FIG. 3A by the numerals 232 and 234 are designed to remain in spaced relationship so long as the apparatus is properly loaded. Hence the pressurization of the fluid medium within the chamber 228 will maintain the surfaces 232 and 234 in spaced relationship. However, in the event of overload and compression beyond normal limits of the fluid medium within the chamber 228 and the surfaces 232 and 234 will move toward abutting relationship. Only in the event of extreme overload will the surfaces 232 and 234 come into engagement, in which case the full force of compression is transmitted to the compression eccentric 38 and all other parts between the ram assembly 52 and the driving means.

The overload ram 226 is movable downwardly to the ledge 236 defined by the upper circular edge of the part 238. The ledge 236 limits the downward travel of the overload ram 226. The hold down ram 222 is movable in vertical direction within limits defined by overload ram 226, more particularly its bottom surface, and also the tubular stop member 224, particularly its upper annular surface. It is to be noted that the tubular stop 224 and the part 238 are in threaded engagement so that by rotation of the tubular stop member 224 the vertical adjustment of the tubular stop may be effected, thus determining the degree of movability of the hold down ram 222. As shown in FIG. 3A, the hold down ram 222 is held against movement in vertical direction. However, provision can be made for movement of the hold down ram 222, as might be required when compressing a fragile part. Disposed between the hold down ram 222 and the outer ram 214 is a piston-like intermediate ram 240 formed on the upper extension 213 of the outer ram 214. The intermediate ram 240 has the inner punch 212 depending from its lower end while these parts are rigidly secured to one another. The intermediate ram 240 is movable between a lower surface of the hold down ram 222 designated by the numeral 242 and the upper surface 243 of the liner 218. Although as shown in FIG. 3A the intermediate ram 240 is incapable of vertical movement, it is to be understood that provision can be made for vertical movement of the intermediate ram 240 by further spacing of the mentioned abutment surfaces, which is accomplished by cooperative threading movement between the liner 218 and the cylinder 220. The outer ram 214 is also movable in vertical direction, but within limits defined by the spacing of abutment surfaces on the adjustable sleeve 216 and the liner 218, these parts being threaded together for selectively adjustable relative movement.

Tubular passageways are provided for pressurizing the aforementioned parts of the ram structure 52. For example, if pressurized fluid is introduced to a port 250 there is a tendency to drive the ram 240 upwardly and the ram 214 downwardly. However, if fluid, such as air, is introduced to the port 252 the ram 214 is driven upwardly. Fluid introduced to the port 254 pressurizes the upper surface of the ram 240 and tends to move it downwardly. The pressurization of the various chambers adjacent the ram is for the purpose of adjusting the relative positions of the punches 210 and 212—either when providing a forming surface during compacting of the part or for stripping a formed part from the movable punch surfaces. For example, when fluid is introduced to the port 254 and the port 250, the rams 214 and 240 are pressurized to effect downward movement of the punches 210 and 212 until the lower surfaces of the punches 210 and 212 are in alignment. As another example, if pressurized fluid is introduced to the ports 250 and 252 the other surfaces of the rams 214 and 240 are pressurized and the punches 210 and 212 assume the position shown in FIG. 3A. If the hold down ram 222 has freedom of vertical movement it would also be necessary to introduce pressurized fluid through a port 56 in order to move the ram 222 upwardly.

A further port 258 is provided for pressurizing the upper surface of the hold down ram 222. Such pressurization of hold down ram 222 may be desirable when compacting a fragile part, for example, to control the force exerted on a thin vertical section of the formed part during the ejection cycle.

Referring to FIG. 8–F–I the anti-restrike assembly (not shown in FIG. 1) is illustrated. To each of the platens 64 and 62 are connected an upwardly extending pair of push rods 260 and 262, respectively, which terminate above the upper platen 60 at the same elevation. The rods 260 and 262 are in vertically aligned and closely spaced relationship with the lower ends of associated piston rods 264 and 266 of respective piston and cylinder assemblies 268 and 270. Each of such limited stroke cylinders of the assemblies 268 and 270 are rigidly fixed as by legs 271 to the upper platen 60 and interiorly they each have an upper chamber 272 above the piston and a lower chamber 274 below the piston.

All upper chambers 272 are commonly connected to a high pressure manifold 276 leading by a line 278 through a unidirectional relief valve 280 to an accumulating tank 282. Thus, when there is a decrease in the distances between adjacent platens 60, 62 and 64 during the ejection cycle, the rods 260 and 262 engage the rods 264 and 266 and the hydraulic oil in the upper chamber 272 is displaced under pressurization through the vale 280. Some displaced fluid returns to the lower chambers 274 through a commonly connected low pressure manifold 284, the latter being also connected to the accumulator tank 282. Excess displaced fluid is temporarily stored in the tank 282. This condition prevails throughout the ejection cycle, after which the platens are restored to their previous, more widely spaced-apart relationship. At this time, under constant air pressure from line 286 a pressure chamber 288 in the upper portion of tank 282, above a flexible diaphragm 290, forces the displaced oil from the lower chambers 274 via a bypass line 292 through a check valve 294 back into the upper chambers 272, thereby causing the cylinder assemblies 268 and 270 to reset for the next cycle.

The arrangement of FIG. 8–F–I is such as to provide shock absorbers with upwardly yieldable abutments for each of the platens 62 and 64. This provision prevents premature upward motion of the various punches on die parts during ejection, and maintains downward pressure on the formed part against the fixed punch, thus preventing restrike or secondary impression.

The letter R is used in FIGS. 2A to 2J to designate a reference plane corresponding to the top of the die table in fill position.

Referring now to FIGS. 4–A–I, 4–C, 4–E, 5–I, and 6, the core rod assembly 19 will now be described in detail. It will be recalled that in connection with the description of FIGS. 1A and 2A to 2J the assembly 19 includes an upwardly extending core rod support 21 with a core rod 20 carried at the upper end thereof. The core rod 20 has a tip with a reduced cross section serving as part of the die tooling received within the telescopically arranged punches 63, 65 and 71 within platen 60.

Below the base cover 74 the assembly 19 comprises its casing 69 resting on a pneumatically operated, double-acting cylinder 302 cooperating with an internally positioned, vertically movable piston 304. The cylinder has a port 306 leading to an upper chamber 308 and a port 310 leading to a lower chamber 312. A piston rod 314 extends upwardly into the lower end of the casing 69 where it is joined, as by a threaded conection, to the lower end of the core rod support 21. The piston rod 314 is sealed to the casing 69 by a gland seal 316.

The core rod support 21 is movable vertically within the casing 69, upwardly with the piston 304 until it strikes the anvil 318 of an angularly adjustable fill stop 320, and downwardly with the lower punches 63, 65, 71 during compression until such movement is arrested by the angularly adjustable breech lock compression stop 322. Further downward movement of the support 21 is actuated after compression and ejection of a formed part by rotation of the breech lock stop 322 to the non-inteference pattern of FIG. 5–I. In this view spline teeth 323 of the internal male member 324 are in vertically slidable relationship with the spline teeth 325 of a surrounding female member 326, such angular movement of the female member 326 being controlled by a lever 328. The lever 328 may be moved in the directions indicated by the arrows, clockwise to a non-interference pattern of the teeth 323 and 325 as shown in FIG. 5–I and as indicated therein by solid line arrows. Arrows with broken lines indicate the direction of lever movement effecting counterclockwise rotation of female member 326 establishing during compaction an interference pattern of the teeth 323 and 325 corresponding with FIG. 4–E. Movement of the lever 328 may be by an air cylinder (not shown). The extreme lower position of the core rod support 21, as shown in FIG. 4A–I, is established by the bottom surface of the piston 304 engaging the bottom of cylinder 302.

Although the vertical relationship of the splined male member 324 to the core rod support 21 usually remains fixed for a particular pressing operation until the desired number of parts have been formed, this relationship is selectively adjustable in order to set the limit of vertical travel of the core rod 20 during compression. In other words the clearance, designated in FIG. 4C by the numeral 330, between the lower surface of member 324 and the upper surface of member 326 may be adjusted. This is accomplished by rotating a ring gear 332 by means of a worm gear 334, for example, by rotating worm gear 334 in the direction of the arrow 336 in FIG. 6, the ring gear 332 is turned clockwise, carrying with it for angular movement the member 324 since these parts are interlocked by cooperating spline teeth 338 and 339. The teeth 338, on the interior of the ring gear 332, and the teeth 339, are on the exterior of the member 324, serve to guide the member 324 for movement in vertical directions within the casing 69. Clockwise rotation of the member 324 with the ring gear 332 as seen in FIG. 6 advances the member downwardly by the action of its internal threads cooperating with the lower threaded surface 340 of the core rod support 21, tending to reduce the clearance 330 of FIG. 4C. Opposite rotation will, of course, reverse the motion of the mentioned parts and act to increase clearance 330. The greater the clearance 330, the greater will be the compression stroking of the core rod 20 during compression.

In like manner, a worm gear 342 acts correspondingly to worm gear 334 for turning a ring gear 344 and therewith a splined sleeve 346. The spline teeth 348 of sleeve 346 cooperate with spline teeth 349 internally of ring gear 344 to guide the sleeve 346 for vertical movement, along an upper threaded portion 350, relative to the casing 69. The rotation of sleeve 346 adjusts the vertical relation thereof to the core rod support 21 and therefore its limit of vertical travel. In other words, this adjustment limits the upstroke of the core rod 20 for determining depth of fill when charging the die cavity as in FIG. 2-J. It will be recalled that this is accomplished by abutment of the sleeve 346 against the anvil 318 of the adjustable fill stop 320. This is used, for example, by establishing interference between the vertical spline teeth 351 on the enlarged head 352 of the sleeve 346 and like internal spline teeth 353 on the anvil 318, thereby limiting upward motion of the core rod 20, FIGS. 4A and 2A corresponding. Rotation of the anvil 318 by movement of its associated lever 354, for example by a pneumatic cylinder (not shown), rotates the anvil 318 to a non-interference relationship of the spline teeth 351 and 353, and the core rod 20 is thus freed to move upwardly to the position of FIG. 2C, corresponding to FIG. 4C; when the chamber 312 is pressurized with air admitted through port 310.

After compression of a formed part is complete and the breech lock is moved to the non-interference position of FIG. 5-I, the pressurized air is directed away from port 310 and toward port 306. This pressurizes chamber 308 and drives the core rod 20 down to the position of FIG. 2-I where it is ready to start another cycle.

In a non-interference position, spline teeth or keys of one member are slidably aligned with axially extending spline keyways of the other member, so that the members are axially movable related to one another. In an interference position, axially aligned radially projecting spline teeth act as abutment members to one another for resisting relative axial movement.

Preliminary to operating the press, a variable speed motor (not shown) of the drive mechanism 24 for driving the crankshaft 36 is brought up to selected operating speed. Preferably a brake (not shown) may be engaged to hold the crankshaft 36 against rotation; and a clutch (not shown) between the motor shaft and the crankshaft 36 may be used to keep them out of driving engagement at this time. In addition, the pneumatic system is pressurized at or below a level of 80 p.s.i. The lubrication system is also pressurized. A hopper or reservoir (not shown) for material to be compacted is checked to be sure it is properly filled for delivering an adequate supply of material to the feed shoe 196.

Also preliminary to operation, various movable parts are adjustably positioned to suit the configuration of the part to be formed, allowing for compression stops 140 and 142 are adjusted to proper position as in FIG. 1A; and likewise the platens 60, 62 and 64 and the core rod assembly 19 including the core rod 20 are set as desired, for example as shown in FIGS. 1A and 4A–I.

In starting position, the upper punch assembly 52 is at top dead center and the feed shoe 196 is in residence over the die cavity (See FIG. 2–F). Furthermore, the solenoid valves 172 and 174 are deenergized.

On starting, the crankshaft 36 is released and is driven through a clutch by the motor, after which the upper punch assembly 52 starts to descend and the feed shoe 196 is withdrawn from its FIG. 2–J position in the region above the die cavity. In FIG. 2–A the die cavity is charged at the start of a pressing operation.

Next, the upper punch assembly 52 enters into and seals off the die cavity (see FIG. 2–B). The core rod 20 next advances upwardly to the position of FIGS. 2–C and 4–C, its upward movement being limited by the compaction of material against the inner punch 212 of the upper punch assembly 52. The material to be compacted is displaced by the upward movement of the core rod 20, but it is contained by the outer punch 210 of the upper punch assembly.

As compaction of the material proceeds a compressive force is applied by the assembly 52 to the material, and a lateral component is transferred to the punches 63, 65, 71 defining the walls of the die cavity. Frictional forces between the compressed material and the lower punch assembly increase. As a result, the downacting force of the upper punch assembly 52 is transmitted through the compressed material and the lower punch assembly to the platens 60, 62, 64. This action overcomes the upward bias of the air springs 78 and the die platen 60 is depressed, carrying the ejection rods 82 and pistons 84 with it, while at the same time the cylinders 86 are moving upwardly. The downward motion of the ejection pistons 84 while the cylinder 86 move upwardly causes the piston 84 to displace or redound hydraulic fluid from the lower chamber 101 of the cylinder 86 through the check valve 204 between loop line 166 and the line 160 to the upper chamber 99 of the cylinder 86.

The upper punch assembly 52 continues to move downwardly to the bottom of its stroke thereby completing compaction of the material against the lower fixed punch 71. Simultaneously the platens 60, 62, 64 continue downwardly until such motion is arrested at the bumpers 136, 138 by the compression stops 140, 142.

During the compaction stroke of the upper punch assembly, the closed hydraulic valves hold hydraulic fluid in the upper chamber 99 of each ejection cylinder 86. Consequently, ejection forces are transmitted from each ejection eccentric 44 through its associated rod 80 to the platens 60, 62, 64 via the collar 89 and stripper nuts 100 and 98. The ejection forces overcome the frictional engagement of the formed part with the lower punch assembly connected to the platens, and stripping of the downwardly moving lower punches 63, 65 from the formed part commences.

At this point, the elements 102 and 104 are in engagement with their respective platens 64 and 62; and the latter, in turn are in abutting contact with the stops 140, 142. As downward forces continue, pressure increases in the platen depressor cylinders 54 to a predetermined level; and with actuation of the switch 180, solenoid valve 172 is energized and hydraulic fluid is diverted through line 176 to the cylinder 148 controlling a pair of retrogressive stops 140, thereby overcoming the resistance of the associated air cylinder 152 and breaking the associated toggle joints 144 by moving its members out of alignment to a position of low mechanical resistance. The first set of retrogressive stops 140 are thus withdrawn, and the stripping of the punches 63, 65 from the formed part proceeds to the next lower level.

At the next lower level, the final pair of stripper nuts 100 engage the associated platen 62 and, after actuation of switch 184 and energization of solenoid valve 174, pressurized hydraulic fluid is diverted through line 182 to the other cylinder 150 controlling the pair of retrogressive stops 142, again overcoming air cylinder 154 resistance to break an associated toggle joint 146 by moving its members out of alignment. With this action the final pair of retrogressive stops 142 is withdrawn, and the stripping of the punches 63, 65 from the formed part proceeds to completion. At completion of stripping all punches 63, 65 of the lower punch assembly are lowered to a level flush with the face of the fixed punch 71, as in FIG. 2–H. Thereafter, the core rod 20 is withdrawn from the formed part 356 and the apparatus assumes the positions of FIGS. 1–I, 2–I, 4–I, and 5–I. Next, the lower punch assembly moves toward the position of FIG. 2–J, while the feed shoe 196 bumps the formed part 356 from the die table as it takes charging position over the die table. Simultaneously, barrel cam 198, carried by feed shoe 196, actuates microswitch 200; and the compacting press resets for the start of another cycle.

Referring again to the subject matter of FIG. 9–F–J, a minor modification is optional. In order to reduce the initial lateral force which is required for application to said knee joint when moving the bars 156 and 158 out of substantially upright alignment, the knee joint may be displaced slightly to the left as viewed in FIG. 1–A. Any suitable means may be employed for this purpose. For example, each of the cylinders 148 and 150 may be provided with an extension 151 that is threadedly connected to the piston rod thereof for adjustment of its length in horizontal direction. With this construction the bars 156, and 158 are placed at a slight angular inclination to one another. Accordingly, it should be understood that the expression "upright alignment" as used herein also applies to conditions in which the bars 156 and 158 are at a slight angular inclination to one another in the direction of breaking the toggle joint.

I claim:

1. A downacting type of compacting press, comprising:
   (a) an anvil,
   (b) a fixed punch mounted on said anvil,
   (c) a plurality of vertically movable punches operatively associated with said fixed punch and comprising therewith a lower punch assembly defining a die cavity,
   (d) means for charging said die cavity with flowable material from which a part is to be formed,
   (e) a ram adapted for downacting motion against said lower punch assembly to form a part by compaction of said material,
   (f) driving means providing a source of downacting compressive force and a source of downacting ejection force,
   (g) first connecting means between said driving means and said ram for transmitting a compressive force to said ram,
   (h) yieldably resisting supports for the respective movable punches rigidly connected thereto and being movable downwardly to initial stop positions by said first connecting means during formation of a part,
   (i) stop means for the respective supports presenting resistance to said supports for limiting downward movement of said movable punches to said initial stop position during formation of a part,
   (j) means for withdrawing said stop means when formation of a part is completed to permit further downward movement of said supports and the movable punches carried thereby whereby ejection of the formed part from the die cavity is effected, each stop withdrawing means including a toggle joint comprising two bars jointed together end to end to form a knee providing support for said stop means when said bars are in upright alignment,
   (k) second connecting means between said driving means and said supports for transmitting a downacting ejection force through said supports to said movable punches,
   (l) said fixed punch being supported by said anvil to hold said formed part against downward movement as the movable punches undergo downward movement beyond their respective initial stop positions and are stripped from said formed part, and
   (m) actuating means for applying a force to said toggle joint lateral to said upright alignment tending to move said bars out of upright alignment when formation of a part is completed whereby support for said stop means is withdrawn.

2. A compacting press according to claim 1 wherein said actuating means includes mechanical means adjustable in the same direction as the lateral force applied to said toggle joint for setting said bars at a slight angular inclination to one another when they are in substantially upright alignment, whereby the knee is laterally displaced to reduce the initial force required of said actuating means for moving said bars out of upright alignment.

3. A compacting press according to claim 1 wherein said actuating means comprises a hydraulic device for applying the lateral force to said toggle joint, and further including a pneumatic device arranged in opposition to said hydraulic device for yieldingly resisting said lateral force and tending to hold the bars of said toggle joint in upright alignment until overcome by said lateral force, said pneumatic device returning the bars of said toggle joint to aligned relationship upon cessation of the lateral force applied by said hydraulic device.

4. A compacting press according to claim 3 wherein the second connecting means includes a cylinder containing hydraulic fluid, a piston movable within said cylinder for pressurizing said hydraulic fluid, said piston and said cylinder being interposed between said driving means and movable punch supports whereby resistance to stripping of the movable punches from the formed part exerts a fluid-pressurizing force on said piston, and a hydraulic line between said cylinder and the hydraulic device of said actuating means for applying a lateral force to said toggle joint, whereby said hydraulic device is energized through said second connecting means by said driving means.

5. A compacting press according to claim 4 further including valve structure for diverting fluid from the upper portion of said cylinder to said hydraulic device, and wherein the hydraulic device is an expandable chamber adapted to receive fluid diverted thereto by said valve structure, the diversion of fluid causing deceleration of said movable punches when the stripping of said punches from the formed part is initiated, whereby shock to the formed part is minimized.

6. A compacting press according to claim 4 wherein said driving means includes a first eccentric in driving relationship with said first connecting means and a second eccentric in driving relationship with said second connecting means, said first and second eccentrics being mounted for driving their respective connecting means downwardly with approximately out-of-phase timing, said piston being a double-ating piston movable in vertical direction between upper and lower end portions of said cylinder with hydraulic fluid being disposed in opposite end portions of said cylinder between said piston and the opposite ends of said cylinder, said piston being connected through said second connecting means to said supports, said cylinder being connected to second eccentric for movement therewith, a tubular loop connecting opposite end portions of said cylinder and providing a conduit for hydraulic fluid therebetween, a valve in said loop adapted to either open or close said loop to fluid flow, and control means holding said valve open during upward motion of said second eccentric and said cylinder relative to said piston whereby hydraulic fluid is displaced from a lower portion of said cylinder by said piston through said loop to an upper portion of said cylinder, said control means closing said valve in said loop during downward motion of said second eccentric and said cylinder whereby hydraulic fluid in an upper portion of said cylinder is contained therein and pressurized for transmitting an ejection force from said second eccentric and said cylinder to said piston and thence through said second connecting means and said movable punch supports to said movable punches for stripping the latter from a formed part.

7. A compacting press according to claim 6 further including pressure-responsive valve structure in the hydraulic line between said cylinder and the hydraulic device of said actuating means for closing said hydraulic line at pressures developed in said cylinder below a predetermined pressure value, said valve structure opening said hydraulic line at or above said predetermined pressure value whereby hydraulic fluid is diverted by said valve structure to said hydraulic device for applying a lateral force to said toggle joint when the pressure in said cylinder is increased.

8. A compacting press comprising: an anvil, a fixed punch mounted on said anvil, a plurality of vertically movable punches operatively associated with said fixed punch and comprising therewith a lower punch assembly defining a die cavity, means for charging said die cavity with flowable material from which a part is to be formed, a ram adapted for downacting motion against said lower punch assembly to form a part by compaction of said material, driving means providing a source of downacting compressive force and a source of downacting ejection force, first connecting means between said driving means and said ram for transmitting a compressive force to said ram, yieldably resisting supports for the respective movable punches rigidly connected thereto and being movable downwardly to initial stop positions by said first connecting means during formation of a part, stop means for the respective supports presenting resistance to said supports for limiting downward movement of said movable punches to said initial stop position during formation of a part, means for withdrawing said stop means when formation of a part is completed to permit further downward movement of said supports and the movable punches carried thereby whereby ejection of the formed part from the die cavity is effected, second connecting means between said driving means and said supports for transmitting a downacting ejection force through said supports to said movable punches, said fixed punch being supported by said anvil to hold said formed part against downward movement as the movable punches undergo downward movement beyond their respective initial stop positions and are stripped from said formed part, a base; an upright frame rigidly mounted on said base and carrying said driving means in an upper portion thereof; said driving means comprising a crankshaft mounted for rotation on a horizontal axis, a compression eccentric on said crankshaft intermediate the ends thereof in driving relation to said first connecting means, and a pair of ejection eccentrics deposed on said crankshaft intermediate said first eccentric and the respective ends of said crankshaft in driving relation to said second connecting means, the downward strokes of said ejection eccentrics being in phase with one another and out of phase with that of said compression eccentric; means for biasing said movable punch supports upwardly; means on said frame guiding said movable punch supports for movement in vertical direction; means operative with said biasing means for limiting upward travel of said supports under upward bias for maintaining the positional and vertical spacial relationship of said support to one another and being provided with lost motion in downward direction to permit changes in said relationship of said supports during downward movement; means, operative with said ram in downward direction for depressing said movable punch supports, including at least one depending member outboard of said ram, and vertically extending rods extending upwardly from said supports for driving engagement by said depending member; said second transmitting means including hydraulic cyclinders connected to the respective ejection eccentrics, and pistons in the respective cylinders to said supports, with hydraulic fluid interposed between each piston and its associated cylinder for transmitting ejection force between said ejection eccentrics and said supports when pressurized; and control means responsive to the angular position of said crankshaft during rotation thereof for maintaining said hydraulic fluid under pressure only during downward motion of said cylinders and for diverting pressurized hydraulic fluid to said withdrawing means to actuate the same upon a buildup of hydraulic pressure to a predetermined value.

9. A compacting press comprising: an anvil, a fixed punch mounted on said anvil, a plurality of vertically movable punches operatively associated with said fixed punch and comprising therewith a lower punch assembly defining a die cavity, means for charging said die cavity with flowable material from which a part is to be formed, a ram adapted for downacting motion against said lower punch assembly to form a part by compaction of said material, driving means providing a source of downacting compressive force and a source of downacting ejection force, first connecting means between said driving means and said ram for transmitting a compressive force to said ram, yieldably resisting supports for the respective movable punches rigidly connected thereto and being movable downwardly to initial stop positions by said first connecting means during formation of a part, stop means for the respective supports presenting resistance to said supports for limiting downward movement of said movable punches to said initial stop position during formation of a part, means for withdrawing said stop means when formation of a part is completed to permit further downward movement of said supports and the movable punches carried thereby whereby election of the formed part from the die cavity is effected, second connecting means between said driving means and said supports for transmitting a downacting ejection force through said supports to said movable punches, said lower punch assembly being supported at least partly by said anvil to hold said formed part against downward movement as the movable punches undergo downward movement beyond their respective initial stop positions and are stripped from said formed part, said second connecting means including a vertically elongated rod extending through said movable punch supports, means engaging said rod at the lower end thereof for biasing said element upwardly and being yieldable under an oppositely directed greater force for downward movement, means interposed between the upper end of said rod and said driving means for transmitting a downward force to said rod which is greater than the upward force of said biasing means whereby said rod is moved downwardly, and a plurality of driving members for the respective movable punch supports, each driving member being adjustably secured to said rod in position to engage its associated movable punch support for transmitting a downward force thereto, the movable punches being moved downwardly with their associated punch supports relative to the formed part beyond their initial stop positions.

10. In a compacting press having structure including a punch assembly defining a die cavity with means for closing one end of said die cavity and an anvil for supporting at least part of said punch assembly, wherein said punch assembly includes a fixed, outer tubular member formed about an upright axis, an axially elongated core rod assembly disposed within said tubular member and adapted for movement in axial direction inwardly and outwardly of said die cavity through the other end of said die cavity, means for moving said core rod assembly axially, and an abutment mechanism movable into and out of interposition between the core rod assembly and the anvil, said abutment mechanism when in interposition providing a positive compression stop downwardly against said anvil for said core rode assembly, or the like, the improvement wherein said abutment mechanism includes a spline shaft connection between a portion of said core rod assembly and a portion of said tubular member, and means for rotating said core rod assembly relative to said tubular member when said portions are axially displaced from one another, said spline shaft connection comprising an annular series of radially projecting keys on said core rod assembly formed by providing a plurality of equally spaced, axially extending grooves in said portion of the core rod assembly, and said portion of the tubular member having axially extending grooves formed on its internal surface to provide axial keyways for the respective keys with radially inwardly extending abutment members between said keyways, said rotating means moving said core rod assembly relative to said tubular member between a first position wherein said keys and said keyways are axially aligned and a second position wherein said keys and said abutment members are axially aligned; whereby in first position said portions when engaged are axially movable relative to one another; and whereby in second position said portions when engaged are in an abutting relationship interposing said abutment mechanism between said core rod assembly and said anvil.

References Cited

UNITED STATES PATENTS

| Patent No. | Date | Inventor | Class |
|---|---|---|---|
| 3,337,916 | 8/1967 | Smith | 18—16.7 |
| 3,460,202 | 8/1969 | Graf et al. | 18—16.7 X |
| 3,464,089 | 9/1969 | Smith | 18—16.7 |
| 3,191,232 | 6/1965 | Haller | 18—16.7 |
| 3,492,696 | 2/1970 | Haller | 18—16.5 |
| 2,810,929 | 10/1957 | Willi | 18—16.7 |
| 2,821,748 | 2/1958 | Willi | 18—16.7 |
| 2,336,982 | 12/1943 | Cremer | 18—16.5 |
| 2,398,227 | 4/1946 | Hubbert | 18—16.5 |
| 2,509,783 | 5/1950 | Richardson | 18—16.7 |
| 2,562,876 | 8/1951 | Baega | 18—16.5 |
| 2,796,633 | 6/1957 | Carlson et al. | 18—16.5 |
| 2,883,703 | 4/1959 | Frank | 18—16.7 |
| 3,168,759 | 2/1965 | Johannigmon | 18—16.7 |
| 3,172,156 | 3/1965 | Belden | 18—16.7 |

J. HOWARD FLINT, JR., Primary Examiner

U.S. Cl. X.R.

425—107, 163, 262, 344, 351